(12) United States Patent
Watts et al.

(10) Patent No.: US 10,634,094 B2
(45) Date of Patent: Apr. 28, 2020

(54) METHODS, SYSTEMS AND APPARATUSES FOR COMBUSTIBLE LEAD FOR HIGH TRIPLE POINT PROPELLANTS

(71) Applicant: THE BOEING COMPANY, Chicago, IL (US)

(72) Inventors: Daniel A. Watts, Surfside, CA (US); David S. Jenkins, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 531 days.

(21) Appl. No.: 15/166,558

(22) Filed: May 27, 2016

(65) Prior Publication Data

US 2017/0342943 A1  Nov. 30, 2017

(51) Int. Cl.
*F02K 9/58* (2006.01)
*F02K 9/42* (2006.01)
*B64G 1/40* (2006.01)

(52) U.S. Cl.
CPC .............. *F02K 9/58* (2013.01); *B64G 1/401* (2013.01); *B64G 1/402* (2013.01); *F02K 9/42* (2013.01); *F02K 9/425* (2013.01)

(58) Field of Classification Search
CPC ........... B64G 1/401; B64G 1/402; F02K 9/42; F02K 9/58
See application file for complete search history.

(56) References Cited

U.S. PATENT DOCUMENTS

| | | | | |
|---|---|---|---|---|
| 4,491,484 A | * | 1/1985 | Williams | B08B 7/0092 134/17 |
| 5,148,674 A | * | 9/1992 | Morris | F02K 9/56 60/240 |
| 2009/0133788 A1 | | 5/2009 | Mungas et al. | |
| 2011/0005420 A1 | * | 1/2011 | Fullerton | F02K 7/02 102/202.7 |
| 2012/0279197 A1 | | 11/2012 | Mungas et al. | |
| 2013/0205754 A1 | * | 8/2013 | Sackheim | C06B 47/04 60/257 |
| 2015/0027102 A1 | * | 1/2015 | Bahn | F02K 9/425 60/258 |

OTHER PUBLICATIONS

Zakirov, Vadim, Nitrous Oxide as a Rocket Propellant, 2001, Elsevier Ltd (Year: 2001).*

* cited by examiner

*Primary Examiner* — William H Rodriguez
*Assistant Examiner* — Kyle Robert Thomas
(74) *Attorney, Agent, or Firm* — Coats & Bennett, PLLC

(57) ABSTRACT

Methods, systems and apparatuses are disclosed for delivering high triple point propellant to a rocket engine and maintaining the desired phase of the propellant during engine ignition.

19 Claims, 12 Drawing Sheets

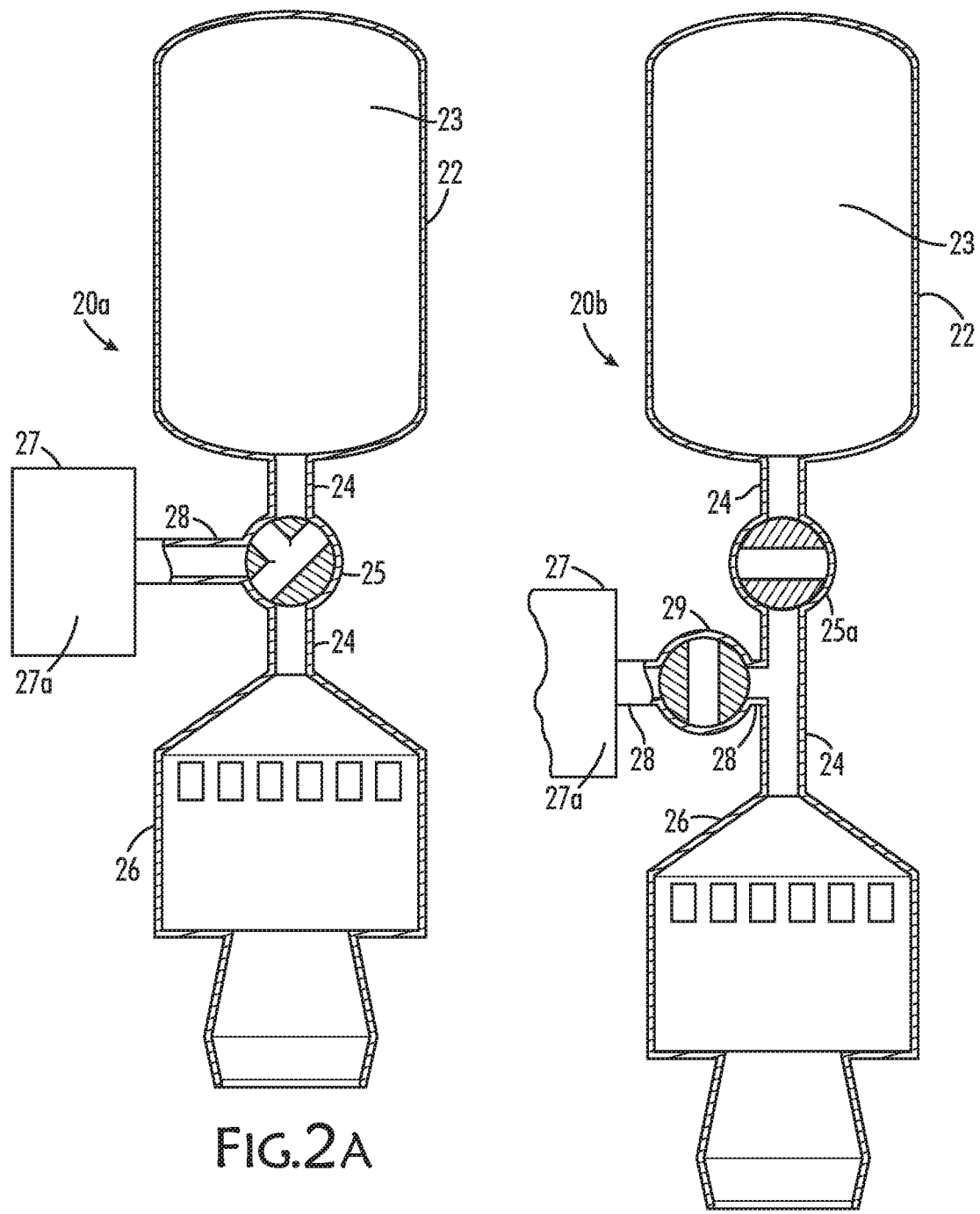

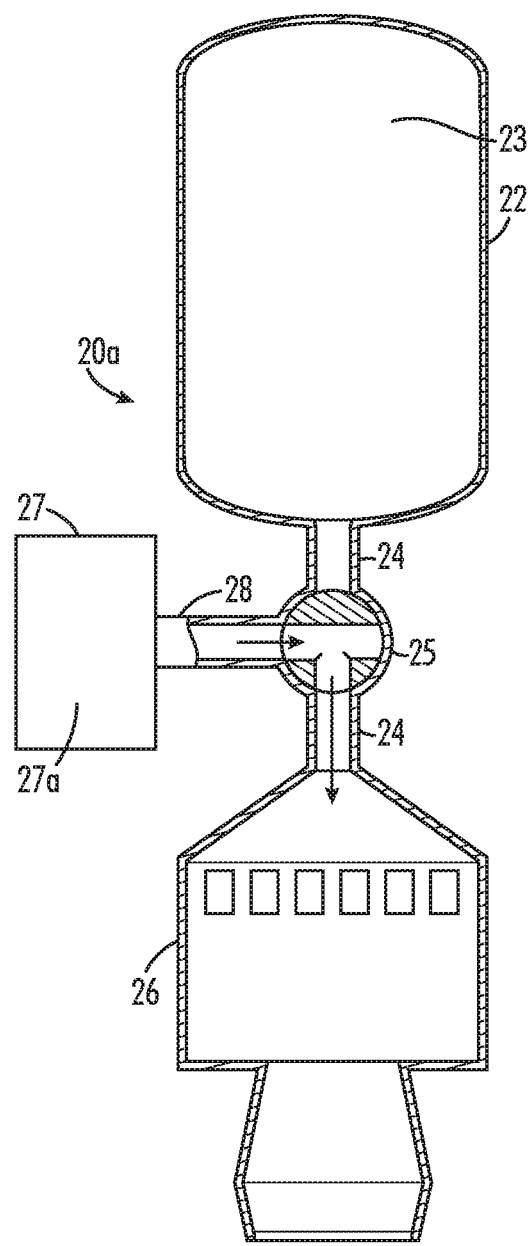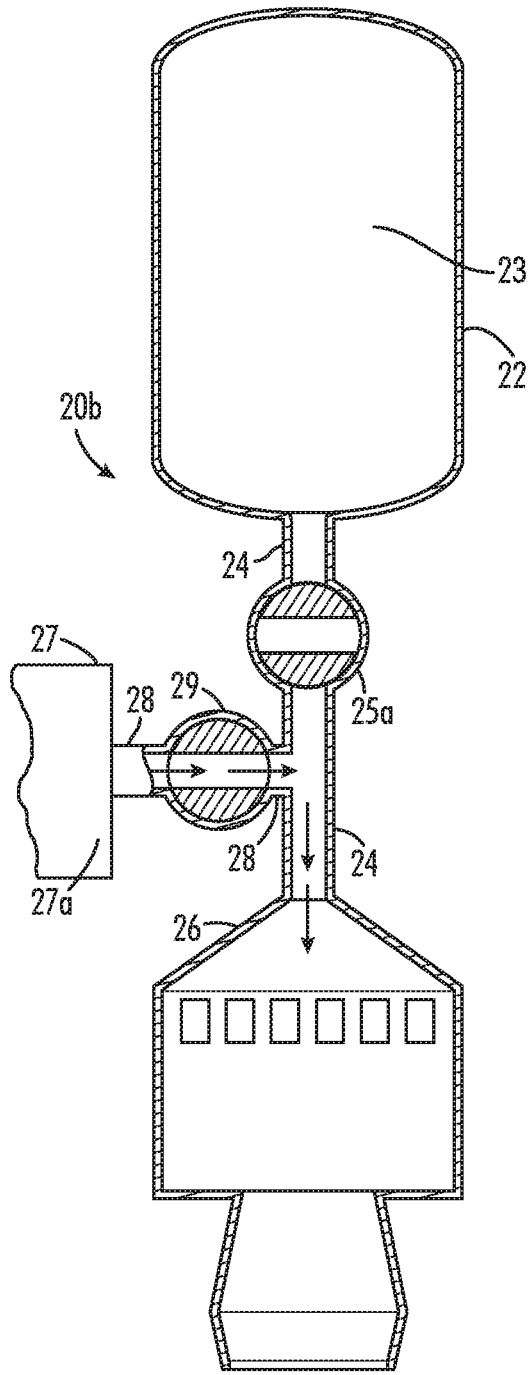
FIG.3A
FIG.3B

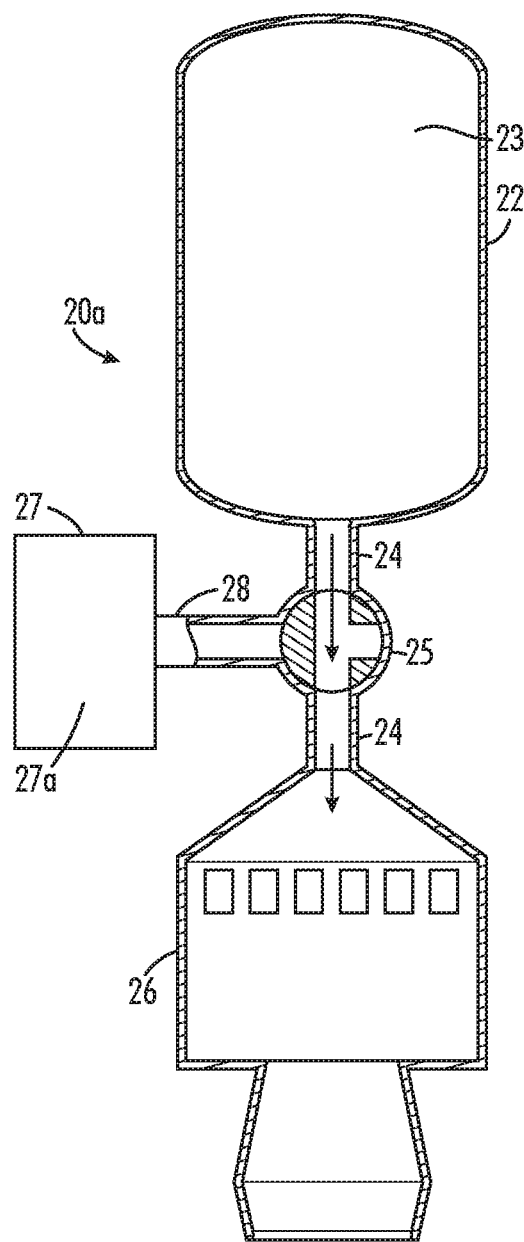
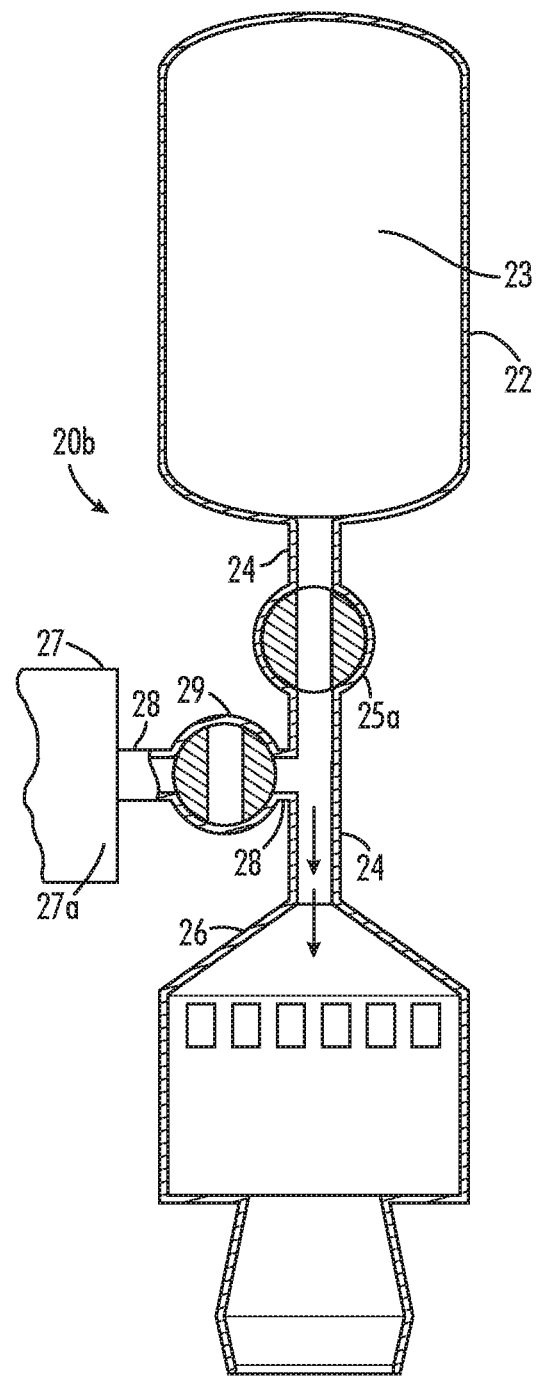
FIG.4A
FIG.4B

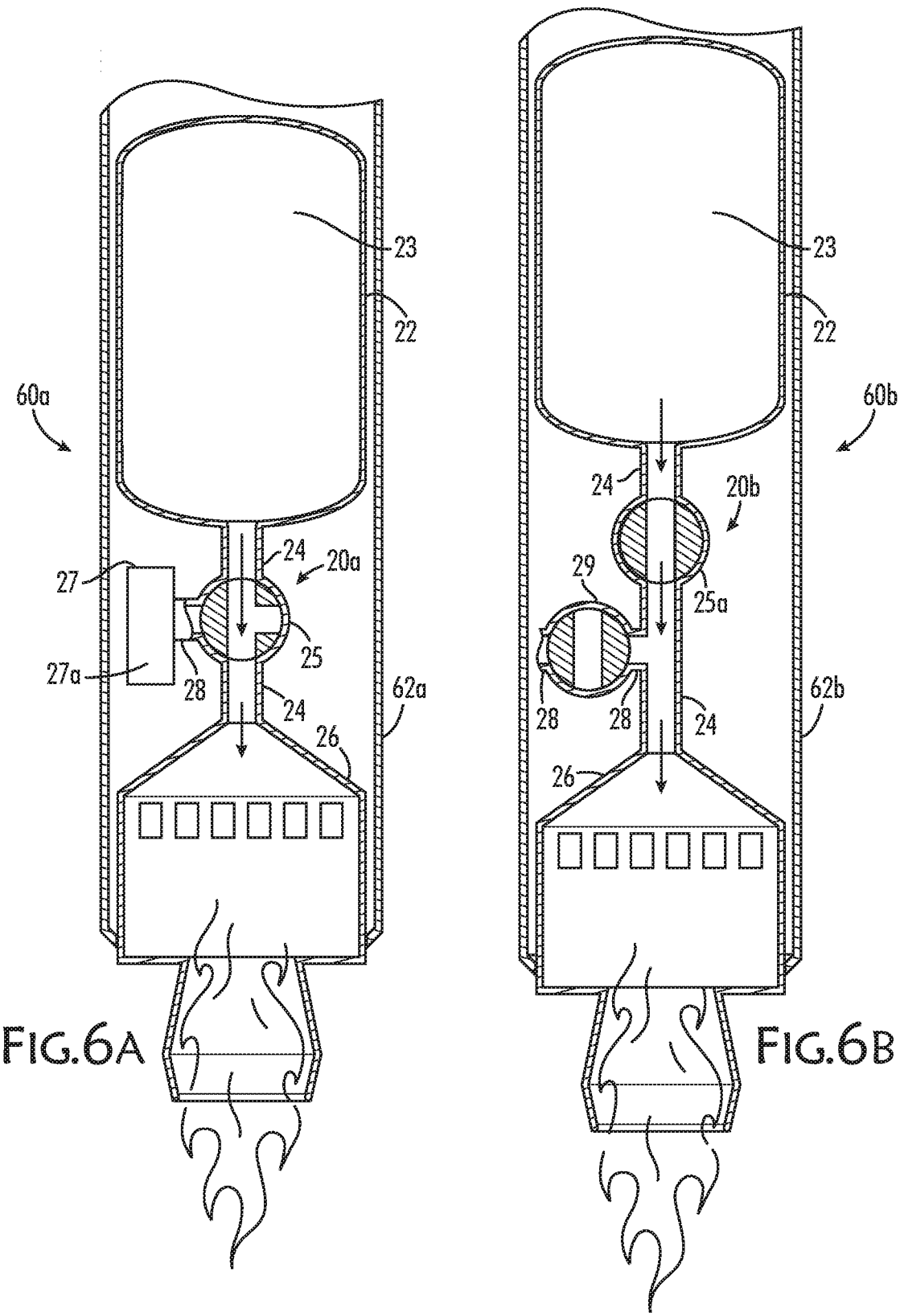

METHODS, SYSTEMS AND APPARATUSES FOR COMBUSTIBLE LEAD FOR HIGH TRIPLE POINT PROPELLANTS

TECHNOLOGICAL FIELD

The present disclosure generally relates to the field of engine propellant delivery methods, systems and apparatuses. More particularly, the present disclosure relates to the field of rocket engine propellant delivery, especially the use and delivery of high triple point rocket engine propellants.

BACKGROUND

A propellant is understood to be a substance, usually a mixture of fuel and oxidizer for propelling an object including, without limitation, a rocket. High triple point propellants are useful fuels in the field of rocketry. The triple point of a substance is understood to be the temperature and pressure at which the three phases of that substance (solid, liquid and gas) coexist in thermodynamic equilibrium. High triple point propellants have their triple point above ambient pressure or above the pressure of an engine combustion chamber at the time of engine ignition.

In the field of rocketry, the propellants used during engine ignition are subjected to significant thermodynamic challenges as they proceed from on-board propellant storage pressures and temperatures, typically in a fuel tank, and into the combustion chamber of a rocket engine. Certain so-called high triple point propellants have gained interest due to their suitable performance in rocket engine systems. However, high triple point propellants present challenges relative to their use in rocket-based missions, including missions in space.

For example, at engine start up, the combustion chamber of a rocket engine is at a lower pressure (usually near ambient pressure) than the storage pressure of the propellant. If a propellant has a triple point higher than the ambient pressure, the state of the liquid propellant will begin to change from liquid to a gas and solid. If a solid phase forms during ignition, such propellant in solid form can interfere with a desired steady flow of propellant into the combustion chamber of a rocket engine. For example, plugging of injection openings into an engine may occur, interfering with optimum flow, or causing oscillated (e.g. uneven) flow. Both plugging of the injector and oscillated flow of propellant into an engine, especially during start up (e.g. ignition), can cause significant problems relative to an ignition sequence regimen.

Mechanical methods have been attempted to physically block or partially block propellant flow through an engine nozzle throat, in an attempt to achieve a pressure within an engine chamber that maintains a high triple point propellant in its desired phase as propellant flow is established into the combustion chamber of a rocket engine. Such mechanical methods include mechanical plugs inserted into the throat of an engine (e.g. burst disc, throat plug). Such mechanical devices are often set at a predetermined pressure setting that is influenced by ambient temperature. In other words, if the temperature environment of such device varies, the set pressure also varies. In addition, once such mechanical devices "release" (e.g. rupture, etc.), the flow rate of propellant into the combustion chamber dramatically increases, potentially causing the combustion chamber pressure to vary; possibly dropping below the propellant's triple point. In addition, such devices used to build pressure and then release are single use devices, and thus do not address the problem of relight of the engine, such as, relight of a rocket engine at a later point in the mission in space, etc.

BRIEF SUMMARY

The present disclosure relates to methods, systems and apparatuses for delivering a high triple point propellant to an engine.

According to one aspect of the disclosure, methods are disclosed for maintaining a high triple point propellant in a predetermined phase during ignition of a rocket engine comprising delivering a flow of combustible gas to a location downstream from a high triple point propellant valve, and combusting the combustible gas to achieve a predetermined pressure in the rocket engine, wherein the predetermined pressure is greater than or equal to a pressure to maintain the high triple point propellant in the predetermined phase.

A further aspect comprises terminating the flow of combustible gas substantially simultaneously with the step of delivering the flow of high triple point propellant to the rocket engine.

According to a further aspect, in the step of delivering a flow of high triple point propellant to the rocket engine, the high triple point propellant comprises a monopropellant, a blended fuel propellant, a bi-propellant and combinations thereof.

In another aspect, in the step of delivering a flow of high triple point propellant to the rocket engine, the high triple point propellant comprises: nitrous oxide, nitrous oxide/propane, nitrous oxide/acetylene, nitrous oxide/ethane, nitrous oxide/ethylene nitrous oxide/methane, nitrous oxide/oxygen and combinations thereof.

In a further aspect, in the step of delivering a flow of combustible gas to the rocket engine at a location downstream from a high triple point propellant, the combustible gas comprises a monopropellant, a blended fuel propellant, a bi-propellant and combinations thereof.

In yet another aspect, in the step of delivering a flow of combustible gas to the rocket engine at a location downstream from a high triple point propellant, the combustible gas comprises hydrogen/oxygen, methane/oxygen, nitrogen/hydrogen/oxygen and combinations thereof.

According to another aspect, a method is disclosed for maintaining a high triple point propellant in a predetermined phase during ignition of a rocket engine comprising delivering a flow of combustible gas to a location downstream from a high triple point propellant, and substantially coincident with the step of delivering a flow of combustible gas to the rocket engine at a location downstream from a high triple point propellant delivering a flow of inert gas to the rocket engine at a location downstream from the high triple point propellant valve.

In another aspect, substantially coincident with the step of generating a flow of high triple point propellant to the rocket engine, terminating the flow of at least one of the combustible gas and the inert gas to the rocket engine.

In a further aspect, in the step of delivering a flow of inert gas to the rocket engine at a location downstream from a high triple point propellant valve, the inert gas comprises nitrogen, helium, argon, neon, krypton or combinations thereof.

In still another aspect, a rocket engine is disclosed comprising a high triple point propellant in communication with the rocket engine via a propellant line, a propellant valve, with the propellant valve in communication with the propellant line, with the propellant valve operable to regulate the flow of high triple point propellant, a combustible gas in communication with the rocket engine via a combustible gas line at a predetermined location downstream of the propellant valve, and a combustible gas valve in communication with the combustible gas line, with the combustible gas valve operable to regulate flow of combustible gas to the rocket engine.

In a further aspect the high triple point propellant comprises a monopropellant, a blended fuel propellant, a bi-propellant and combinations thereof.

In another aspect, the high triple point propellant comprises nitrous oxide, nitrous oxide/propane, nitrous oxide/acetylene, nitrous oxide/ethane, nitrous oxide/ethylene, nitrous oxide/methane, nitrous oxide/oxygen and combinations thereof.

In a further aspect, the combustible gas comprises a monopropellant, a blended fuel propellant, a bi-propellant and combinations thereof.

In yet another aspect, the combustible gas comprises oxygen/hydrogen, methane/oxygen, nitrogen/hydrogen/oxygen and combinations thereof.

In yet another aspect, the rocket engine further comprises an inert gas in communication with the rocket engine via an inert gas line, and an inert gas valve in communication with the inert gas line, with the inert gas valve operable to regulate flow of the inert gas.

In another aspect, the inert gas comprises nitrogen, helium, argon, neon, krypton, and combinations thereof.

In a further aspect, at least one of the high triple point propellant valve and the combustible gas valve is operable to regulate at least two of the high triple point propellant gas, the combustible gas and the inert gas.

In yet another aspect, the rocket engine is operable to achieve engine restart.

In yet another aspect, a rocket is disclosed comprising a rocket engine comprising a high triple point propellant in communication with the rocket engine via a propellant line, a propellant valve, with the propellant valve in communication with the propellant line, with the propellant valve operable to regulate flow of the high triple point propellant, a combustible gas in communication with the rocket engine via a combustible gas line at a predetermined location downstream of the propellant valve, and a combustible gas valve in communication with the combustible gas line, with the combustible gas valve operable to regulate flow of combustible gas to the rocket engine. In a further aspect, a vehicle comprises the disclosed rocket engine.

In another aspect, the vehicle comprising the disclosed rocket engine includes a manned aircraft, an unmanned aircraft, a manned spacecraft, an unmanned spacecraft, a manned rotorcraft, an unmanned rotorcraft, a manned satellite, an unmanned satellite, a manned terrestrial vehicle, an unmanned terrestrial vehicle, a manned surface marine vehicle, an unmanned surface marine vehicle, a manned sub-surface marine vehicle, an unmanned sub-surface marine vehicle, and combinations thereof.

BRIEF DESCRIPTION OF THE DRAWINGS

Figure 1:
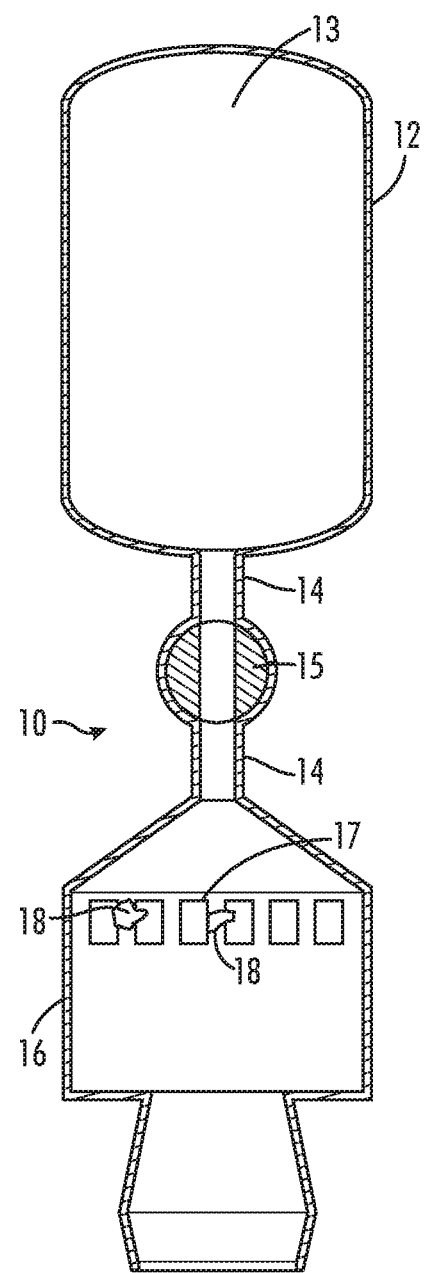
Figure 5A:
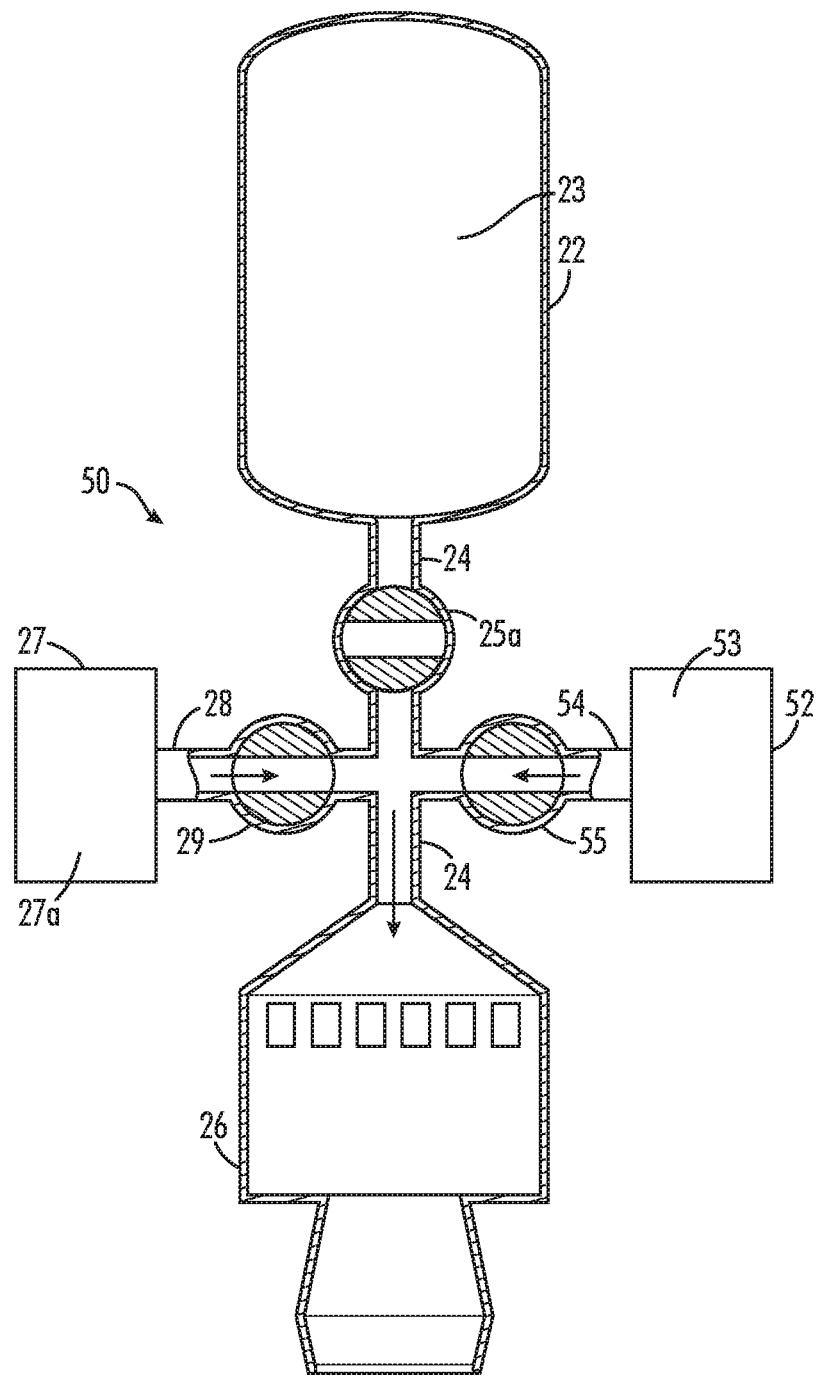
Figure 5B:
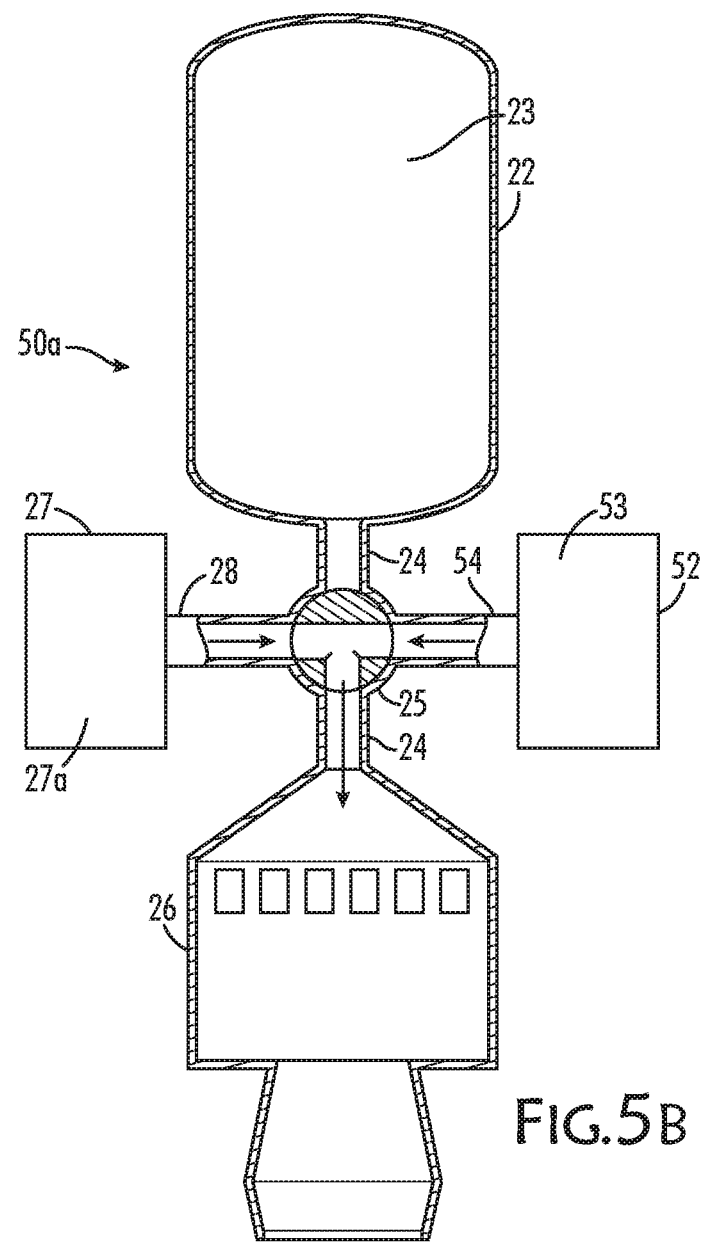
Figure 5C:
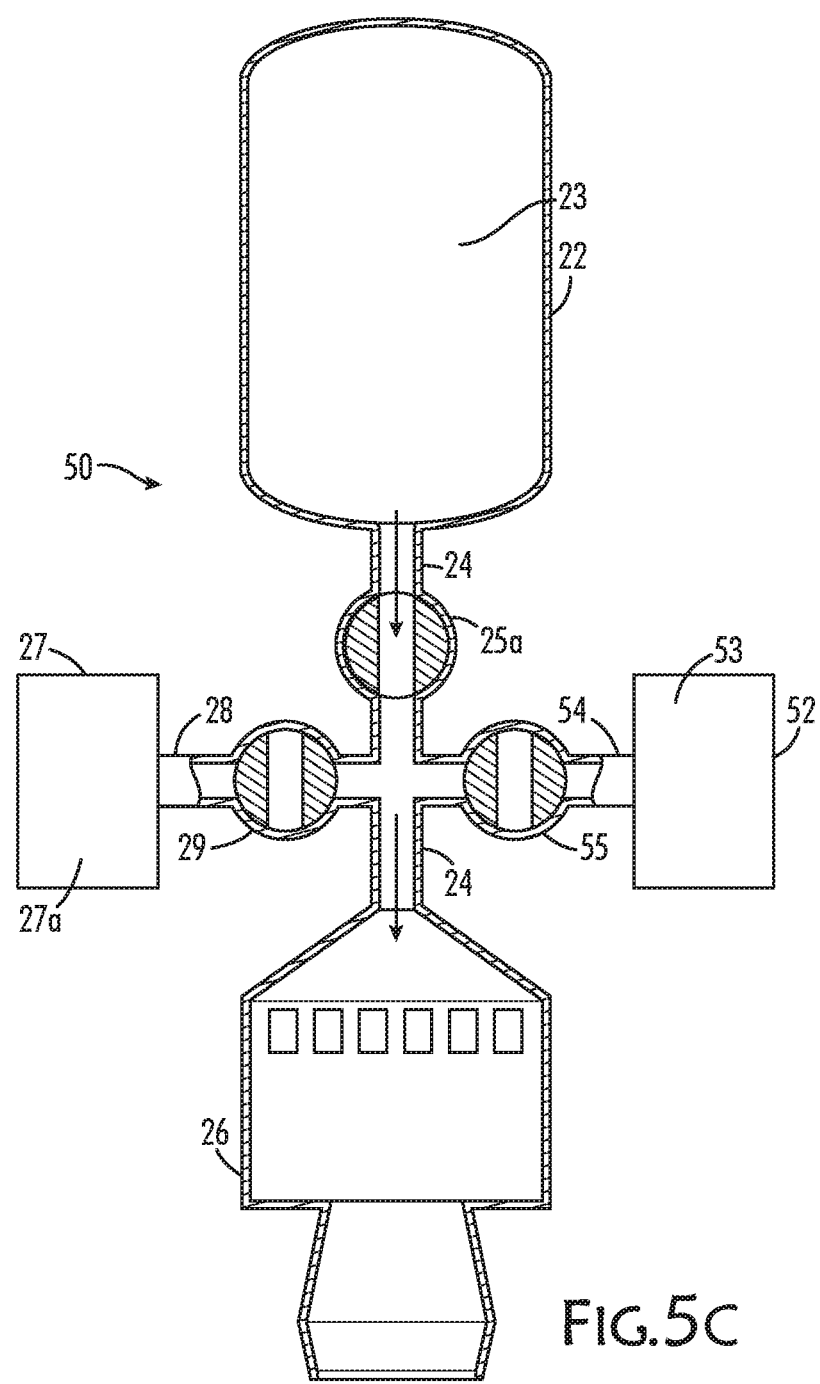

Having thus described variations of the disclosure in general terms, reference will now be made to the accompanying drawings, which are not necessarily drawn to scale, and wherein:

FIG. 1 is a schematic representation of a rocket fuel propellant system;

FIGS. 2A, 2B, 3A, 3B, 4A, 4B are schematic representations of aspects of the present disclosure showing a combustible gas and a high triple point propellant directed to a valve and/or an engine compartment via a combustible gas line and a high triple point propellant line respectively;

FIGS. 5A, 5B, 5C are schematic representations of aspects of the present disclosure showing an inert gas, a combustible gas and a high triple point propellant directed to a valve and/or an engine compartment;

FIGS. 6A and 6B are schematic representations of a rocket comprising a rocket engine according to an aspect of the present disclosure; and FIGS. 7-10 are flowcharts for aspects of the present disclosure.

DETAILED DESCRIPTION

Aspects of the present disclosure are directed to methods, systems and apparatuses for maintaining the predetermined phase of a high triple point propellant in a rocket engine system by pre-pressurizing a rocket engine chamber with a flow of combustible gas, or a flow of combustible gas and inert gas, and combusting the combustible gas before releasing high triple point propellant into the rocket engine. In this way, the rocket engine combustion chamber is "pre-pressurized" and the high triple point propellant is then directed from the propellant tank to the rocket engine at a substantially constant pressure, and the high triple point propellant is not subjected to a pressure drop as the propellant is directed from the propellant tank to the rocket engine combustion chamber. Since the high triple point propellant is maintained at a pressure that is at or above the high triple point pressure, the propellant does not sustain an undesired phase change. That is, the high triple point propellant is maintained at a predetermined phase (e.g. from its phase as stored in the propellant tank) throughout the propellant's flow from the propellant tank to the rocket engine combustion chamber.

Therefore, the methods, systems and apparatuses of the present disclosure are in strong contrast to known mechanical devices (e.g. plugs and burst discs) used in an attempt to pressurize a rocket engine chamber prior to the release of propellant. Such mechanical devices are one-use devices that provide no solution after the rocket engine's initial ignition and the rocket's initial launch. If a mission necessitates a restart of the engine, the mechanical devices are no longer present to achieve a desired and predetermined pre-pressurization of the rocket engine combustion chamber.

According to aspects of the present disclosure, combustible gas is released from a combustible gas storage tank or can be generated from a gas generator with either a solid or liquid propellant in the gas generator. The combustible gas is a fuel gas or is an otherwise oxygen rich gas.

According to an aspect of the present disclosure, a combustible gas (also referred to equivalently herein a combustible "lead" gas) is premixed such that the combustion characteristics of the combustible lead gas are known, resulting in consistent, predictable and predetermined engine start-up. The arrangement of the combustible lead gas is independent of the high triple point propellant flow such that the combustible lead gas flow can be tested independent of the high triple point propellant flow.

According to one aspect, when the combustible gas is introduced to the same line as the high triple point propellant, the present disclosure contemplates the introduction of a combustible lead gas to the propellant line at a point downstream from a propellant control valve. In such an arrangement, the propellant valve can be closed relative to a high triple point propellant flow and the combustible gas introduced at a point downstream from the propellant valve, with the combustible gas then introduced into the engine chamber. The combustible gas is then combusted raising the pressure in the engine combustion chamber and in the portion of the propellant line that extends from the engine to the propellant valve. According to aspects of the present disclosure, a sensor can be employed, for example, as a part of, or proximate to, the propellant valve to evaluate that the system is now pressurized to a predetermined pressure that is at least substantially equivalent to the triple point of the high triple point propellant. At this point the flow of the combustible gas can be terminated while substantially coincidentally opening the propellant valve and releasing high triple point propellant from the propellant tank into the now pre-pressurized propellant line and into the now pre-pressurized rocket engine combustion chamber.

According to the present disclosure, the time between the shut off of the combustible gas flow and the opening of the propellant valve to release propellant is understood to be a duration ranging from about 5 msec. to about 1 sec. for many engine systems. However, in some larger systems, the duration between the termination of the combustible gas flow and the initiation of the high triple point propellant flow may range from about 2 to about 5 seconds. Therefore, this relatively short duration is considered for the purposes of the present disclosure to be "substantially simultaneous" or "substantially coincident". For the purposes of the present disclosure, the terms "substantially simultaneous" and "substantially coincident" are equivalent terms and are used interchangeably. However, the precise duration of the "switchover" of combustible gas flow to propellant flow is whatever time duration is necessary to insure that the engine system (combustion chamber(s) and propellant line(s)) remains pressurized sufficiently so that the propellant does not endure a pressure drop below the high triple point propellant's triple point.

According to the present disclosure, contemplated high triple point propellants comprise a monopropellant including, without limitation, nitrous oxide. Contemplated high triple point propellants further comprise a blended fuel including, without limitation, propane/nitrous oxide, nitrous oxide/ethane, nitrous oxide/ethylene, and combinations thereof. Still further, contemplated high triple point propellants further comprise a bi-propellant including, without limitation, all of the blended propellants listed herein and, in addition, without limitation, nitrous oxide/methane, nitrous oxide/oxygen.

FIG. 1 is a schematic diagram showing a rocket engine system 10 having a propellant tank 12 containing high triple point propellant 13. Propellant line 14 extends from propellant tank 12 to propellant valve 15, and extends from propellant valve 15 into engine combustion chamber 16. Injectors 17 are shown in engine combustion chamber 16. Solid phase propellant particles 18 are shown partially obstructing injectors 17.

FIG. 2A shows an aspect of the present disclosure. In FIG. 2A, a rocket engine system 20a comprises a propellant tank 22 containing a high triple point propellant 23. Propellant line 24 extends from propellant tank 22 to selector valve 25, and then extends from selector valve 25 into engine combustion chamber 26. A combustible gas tank 27 contains a combustible gas 27a. Combustible gas line 28 extends from combustible gas tank 27 into a selector valve 25. According to this aspect, selector valve 25 selectively controls the flow of either high triple point propellant or combustible gas into engine combustion chamber 26. As shown in FIG. 2A, the selector valve 25 is in the closed position relative to both the flow of high triple point propellant 23 and the flow of combustible gas 27a.

FIG. 2B is a variation of the aspect shown in FIG. 2A whereby the flow of high triple point propellant 23 and the flow of combustible gas 27a are controlled via separate valves. As shown in FIG. 2B, a rocket engine system 20b comprises a propellant tank 22 containing a high triple point propellant 23. Propellant line 24 extends from propellant tank 22 to propellant valve 25a, and then extends from propellant valve 25a into engine combustion chamber 26. A combustible gas tank 27 contains a combustible gas 27a. Combustible gas line 28 extends from combustible gas tank 27 into a combustible gas valve 29, and then extends from combustible gas valve 29 into propellant line 24 at a location downstream from the propellant valve 25a. As shown in FIG. 2B, the propellant valve 25a is in the "closed" position relative to the flow of high triple point propellant 23, and the combustible gas valve 29 is in the "closed" position relative to the flow of combustible gas 27a.

FIG. 3A shows the rocket engine system 20a of FIG. 2A with selector valve 25 in the "open" position only for the flow of combustible gas 27a, with the selector valve 25 allowing a flow of combustible gas 27a from combustible gas tank 27 to pass through combustible gas line 28 and selector valve 25 and into propellant line 24 to pressurize engine combustion chamber 26 and propellant line 24 at a location downstream of propellant valve 25 (shown in the position that is "open" to combustible gas 27a flow, but "closed" to high triple point propellant 23 flow). Features shown in FIG. 2A are exemplary implementations of the overall apparatus shown in FIG. 3A.

FIG. 3B shows the rocket engine system 20b of FIG. 2B. As shown in FIG. 3B, a rocket engine system 20b comprises a propellant tank 22 containing a high triple point propellant 23. Propellant line 24 extends from propellant tank 22 to propellant valve 25a, and then extends from propellant valve 25a into engine combustion chamber 26. A combustible gas tank 27 contains a combustible gas 27a. Combustible gas line 28 extends from combustible gas tank 27 via combustible gas line 28 into a combustible gas valve 29, and then extends from combustible gas valve 29 via combustible gas line 28 into propellant line 24 at a location downstream from the propellant valve 25a. As shown in FIG. 3B, the propellant valve 25a is in the "closed" position relative to the flow of high triple point propellant 23, and the combustible gas valve 29 is now in the "open" position relative to the flow of combustible gas 27a. Features shown in FIG. 2B are exemplary implementations of the overall apparatus shown in FIG. 3B.

FIG. 4A shows the rocket engine system 20a of FIGS. 2A and 3A. As shown in FIG. 4A, selector valve 25 is in the "open" position only for the flow of high triple point propellant 23, and is in the "closed" position terminating the flow of combustible gas 27a. Therefore FIG. 4A shows the selector valve 25 allowing a flow of high triple point propellant 23 from propellant tank 22 via propellant line 24, through selector valve 25, and into engine combustion chamber 26. According to an aspect of the disclosure as illustrated in FIG. 4A, selector valve 25 is switched from "closed" to "open" relative to the flow of high triple point propellant 23 from propellant tank 22, and therefore substantially coincidentally switches from "open" to "closed" relative to the flow of combustible gas 27a. Selector valve 25 is switched from the "closed" to "open" position relative to the flow of high triple point propellant 23 from propellant tank 22 within a time duration (considered according to this disclosure as being substantially coincident or substantially simultaneous) such that the pressure in the rocket engine chamber is substantially constant (and above the triple point pressure of the high triple point propellant), as the gas flow into the combustion chamber thereby is changed from a combustible gas flow to a propellant gas flow. Features shown in FIGS. 2A and 3A are exemplary implementations of the overall apparatus shown in FIG. 4A.

FIG. 4B shows the rocket engine system 20b of FIGS. 2B and 3B. As shown in FIG. 4B, a rocket engine system 20b comprises a propellant tank 22 containing a high triple point propellant 23. Propellant line 24 extends from propellant tank 22 to propellant valve 25a, and then extends from propellant valve 25a into engine combustion chamber 26. A combustible gas tank 27 contains a combustible gas 27a. Combustible gas line 28 extends from combustible gas tank 27 into a combustible gas valve 29, and then from combustible gas valve 29 into propellant line 24 at a location downstream from the propellant valve 25a. As shown in FIG. 4B, the propellant valve 25a is in the "open" position relative to the flow of high triple point propellant 23, and the combustible gas valve 29 is now in the "closed" position relative to the flow of combustible gas 27a within a time duration (considered according to this disclosure as being substantially coincident or substantially simultaneous) such that the pressure in the rocket engine chamber is substantially constant (and above the triple point pressure of the high triple point propellant), as the gas flow into the combustion chamber thereby is changed from a combustible gas flow to a propellant gas flow. Features shown in FIGS. 2B and 3B are exemplary implementations of the overall apparatus shown in FIG. 4B.

At the end of an engine combustion event, aspects of the present disclosure contemplate that high triple point propellant flow is terminated by activating the propellant valve (or the selector valve in alternative aspects) to the "closed" position relative to high triple point propellant flow. In the event restart of the rocket engine is required in mission, the above-disclosed cycles are repeated, beginning with the pre-pressurization of the engine combustion chamber with combustible gas, and the combustion of the combustible gas, prior to the release of the high triple point propellant into the engine combustion chamber.

FIGS. 5A-5C show a rocket engine system similar to that shown in FIGS. 2A, 2B, 3A, 3B, 4A, and 4B with the addition of an inert gas supply, and a varied valve arrangement. FIG. 5A shows a rocket engine system 50 that comprises a propellant tank 22 containing a high triple point propellant 23. Propellant line 24 extends from propellant tank 22 to propellant valve 25a, with the propellant line 24 then extending from propellant valve 25a into engine combustion chamber 26. A combustible gas tank 27 contains a combustible gas 27a. Combustible gas line 28 extends from combustible gas tank 27 to combustible gas valve 29, and then extends from combustible gas valve 29 to propellant line 24 at a point downstream from propellant valve 25a. An inert gas tank 52 contains an inert gas 53. Inert gas line 54 extends from inert gas tank 52 to inert gas valve 55, with the inert gas line 54 then extending from inert gas valve 55 to propellant line 24 at a point downstream from propellant valve 25a. In FIG. 5A propellant valve 25a is in a "closed" position, combustible gas valve 29 is "open" and inert gas valve 55 is "open". In this aspect, inert gas is provided to pre-pressurize engine combustion chamber 26 and the portion of propellant line 24 that is located downstream of propellant valve 25. According to this alternative, using a predetermined amount of inert gas to pre-pressurize the system conserves the amount of combustible gas that is otherwise required to pre-pressurize the system. Therefore, an inert gas flow may be complimentary to a combustible gas flow for purposes of pre-pressurization of the engine combustion chamber, may supplant the combustible gas flow, or otherwise may be an optional feature. It is understood that combustible gas line 28 and inert gas line 54 need not intersect propellant gas line 24 at the same location. Features shown in FIGS. 2B, 3B and 4B are exemplary implementations of the overall apparatus shown in FIG. 5A.

FIG. 5B shows a system similar to that shown in FIGS. 2A, 3A and 4A with the addition of a supply of inert gas controlled by a common selector valve (e.g. the selector valve shown in FIG. 5B not only controls the flow to a rocket engine ignition chamber of high triple point propellant and combustible gas, but also controls the flow of an inert gas to a rocket engine combustion chamber). FIG. 5B shows a rocket engine system 50a with a selector valve 25 in the "open" position for the flow of combustible gas 27a, allowing a flow of combustible gas 27a from combustible gas tank 27 to pass through combustible gas line 28 and selector valve 25 and into propellant line 24 to pressurize engine combustion chamber 26 and propellant line 24 downstream of propellant valve 25a. Selector valve 25a is also "open" to a flow of inert gas 53 from inert gas tank 52 via inert gas line 54. However, as shown in FIG. 5B, selector valve 25a is shown as "closed" to the flow of high triple point propellant 23. According to this alternative, using a predetermined amount of inert gas to pre-pressurize the system conserves the amount of combustible gas that is otherwise required to pre-pressurize the system. Therefore, an inert gas flow may be complimentary to a combustible gas flow for purposes of pre-pressurization of the engine combustion chamber, may supplant the combustible gas flow, or otherwise may be an optional feature. Features shown in FIGS. 2A, 3A and 4A are exemplary implementations of the overall apparatus shown in FIG. 5B.

FIG. 5C shows a system similar to that shown in FIG. 5A. FIG. 5C shows the rocket engine system 50, but in this variation inert gas valve 55 is shown in the "closed" position, and combustible gas valve 29 is also shown in the "closed" position terminating the flow of both inert gas 53 and flow of combustible gas 27a into engine combustion chamber 26. Propellant gas valve 25 is shown in the "open" position as high triple point propellant 23 is delivered into engine combustion chamber 26. Features shown in FIGS. 2B, 3B and 4B are exemplary implementations of the overall apparatus shown in FIG. 5C.

FIG. 6A shows an aspect of the present disclosure wherein a rocket 60a comprises a housing 62a containing rocket engine system 20a as shown in FIGS. 2A, 3A and 4A. As shown in FIG. 6A, selector valve 25 is in the "open" position only for the flow of high triple point propellant 23, and is in the "closed" position terminating the flow of combustible gas 27a from combustible gas tank 27 beyond the point of the selector valve 25. Therefore FIG. 4A shows the selector valve 25 allowing only a flow of high triple point propellant 23 from propellant tank 22 via propellant line 24, through selector valve 25, and into engine combustion chamber 26. According to an aspect of the disclosure as illustrated in FIG. 4A, selector valve 25 is switched from "closed" to "open" relative to the flow of high triple point propellant 23 from propellant tank 22, and therefore substantially coincidentally switches from "open" to "closed" relative to the flow of combustible gas 27a. Selector valve 25 is switched from the "closed" to "open" position relative to the flow of high triple point propellant 23 from propellant tank 22 within a time duration (considered according to this disclosure as being substantially coincident or substantially simultaneous) such that the pressure in the rocket engine chamber is substantially constant (and above the triple point pressure of the high triple point propellant), as the gas flow into the combustion chamber thereby is changed from a combustible gas flow to a propellant gas flow. It is understood that aspects illustrated in FIGS. 2A, 3A, 4A and 5B can be incorporated into the aspects of the disclosure illustrated in FIG. 6A.

FIG. 6B shows an aspect of the present disclosure wherein a rocket 60b comprises a housing 62a containing rocket engine system 20b as shown in FIGS. 2B, 3B and 4B. As shown in FIG. 6B, a rocket engine system 20b comprises a propellant tank 22 containing a high triple point propellant 23. Propellant line 24 extends from propellant tank 22 to propellant valve 25a, and then extends from propellant valve 25a into engine combustion chamber 26. A combustible gas tank (not shown in FIG. 6B) contains a combustible gas. Combustible gas line 28 extends from combustible gas tank (not shown in FIG. 6B) via combustible gas line 28 into a combustible gas valve 29, and then from combustible gas valve 29 via combustible gas line 28 into propellant line 24 at a location downstream from the propellant valve 25a. As shown in FIG. 6B, the propellant valve 25a is in the "open" position relative to the flow of high triple point propellant 23, and the combustible gas valve 29 is now in the "closed" position relative to the flow of combustible gas within a time duration (considered according to this disclosure as being substantially coincident or substantially simultaneous) such that the pressure in the rocket engine chamber is substantially constant (and above the triple point pressure of the high triple point propellant), as the gas flow into the combustion chamber thereby is changed from a combustible gas flow to a propellant gas flow. It is understood that aspects illustrated in FIGS. 2B, 3B, 4B, 5A and 5C can be incorporated into the aspects of the disclosure illustrated in FIG. 6B.

Figure 7:
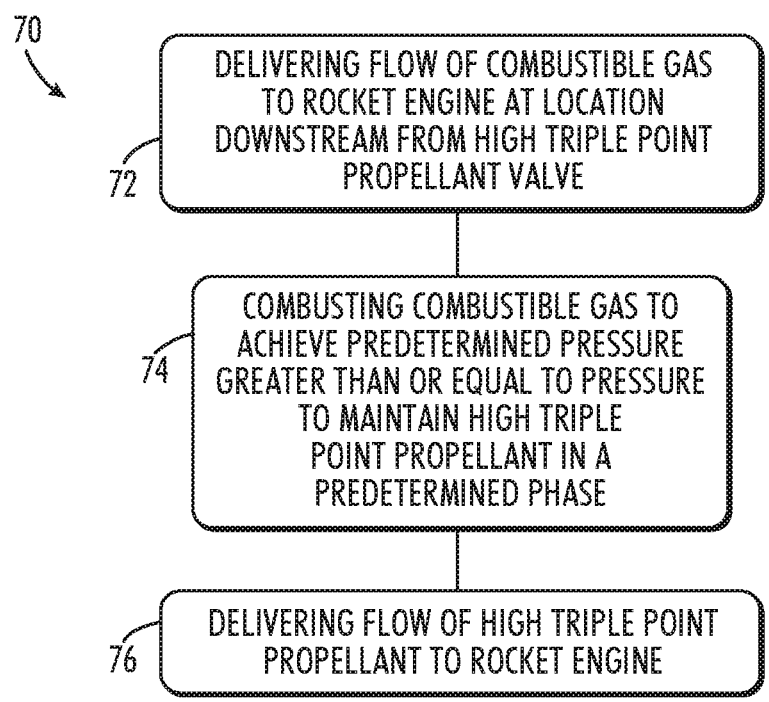

FIGS. 7-10 are flow charts showing aspects of the present disclosure. FIG. 7 outlines a method 70 for maintaining a high triple point propellant in a predetermined phase during a rocket ignition comprising 72 delivering a flow of combustible gas to a rocket engine at a location downstream from a high triple point propellant valve, 74 combusting combustible gas to achieve a predetermined pressure in the engine combustion chamber greater than or equal to the pressure to maintain the high triple point propellant in a predetermined phase (e.g. a pressure above the high triple point propellant triple point pressure), and 76 delivering a flow of high triple point propellant to the rocket engine combustion chamber.

Figure 8:
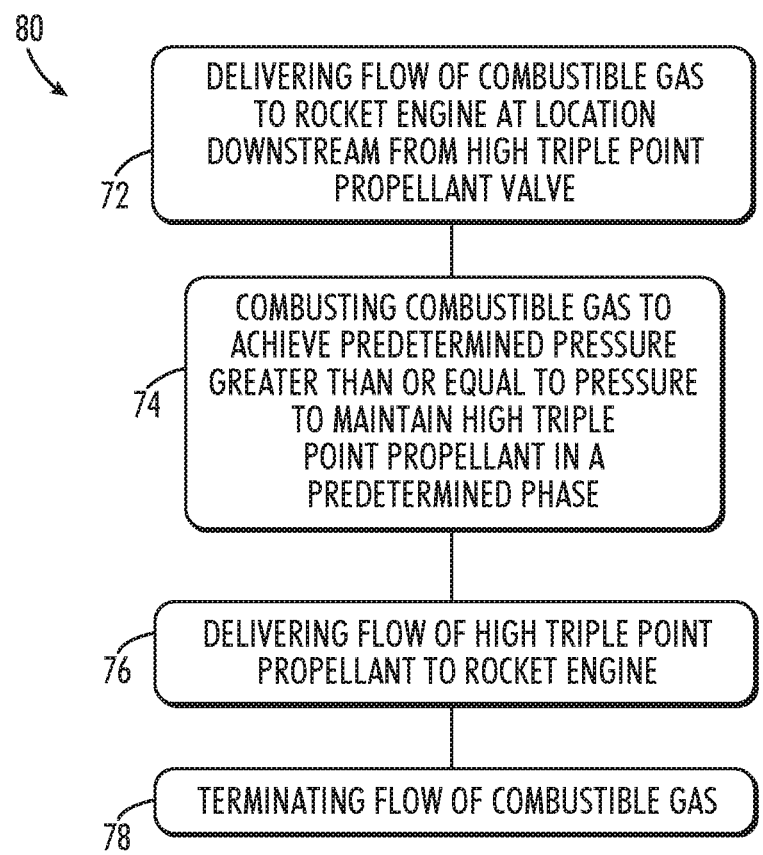

FIG. 8 outlines a further method 80 for maintaining a high triple point propellant in a predetermined phase during a rocket ignition comprising 72 delivering a flow of combustible gas to a rocket engine at a location downstream from a high triple point propellant valve, 74 combusting combustible gas to achieve a predetermined pressure in the engine combustion chamber greater than or equal to the pressure to maintain the high triple point propellant in a predetermined phase (e.g. a pressure above the high triple point propellant triple point pressure), 76 delivering a flow of high triple point propellant to the rocket engine combustion chamber, and, substantially simultaneously with step 76, 78 terminating the flow of combustible gas. It is understood that aspects illustrated in FIG. 7 can be incorporated into the aspects of the disclosure illustrated in FIG. 8.

Figure 9:
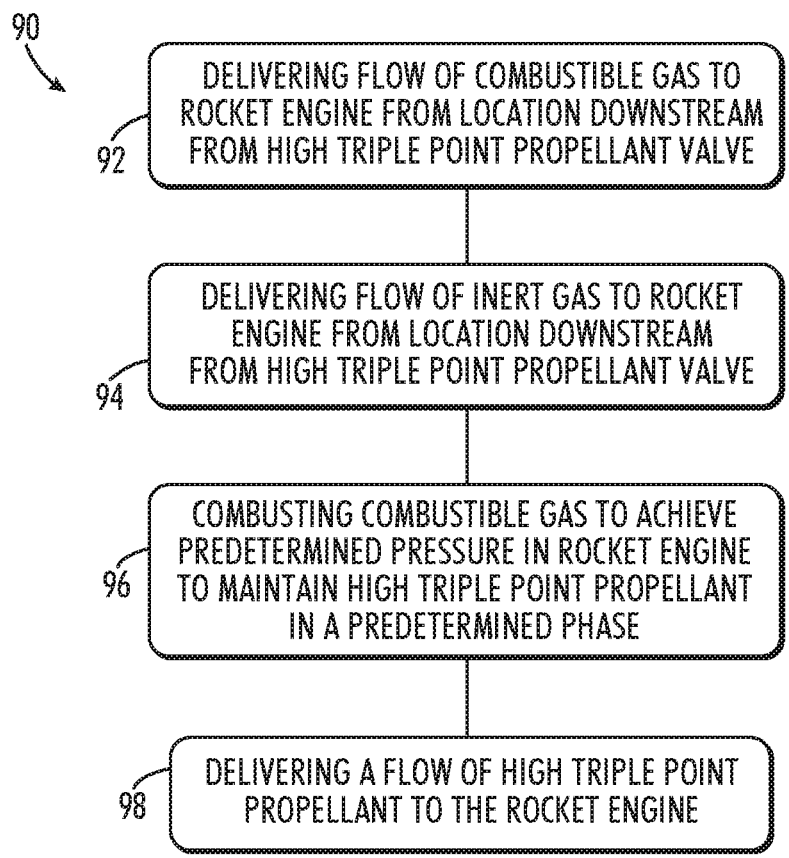

FIG. 9 outlines a further method 90 for maintaining a high triple point propellant in a predetermined phase during a rocket ignition comprising 92 delivering a flow of combustible gas to a rocket engine at a location downstream from a high triple point propellant valve, 94 delivering a flow of inert gas to the rocket engine combustion chamber from a location downstream from the high triple point propellant valve, 96 combusting combustible gas to achieve a predetermined pressure in the rocket engine combustion chamber greater than or equal to the pressure to maintain the high triple point propellant in a predetermined phase (e.g. a pressure above the high triple point propellant triple point pressure), and 98 delivering a flow of high triple point propellant to the rocket engine combustion chamber. It is understood that aspects illustrated in FIGS. 7-8 can be incorporated into the aspects of the disclosure illustrated in FIG. 9.

Figure 10:
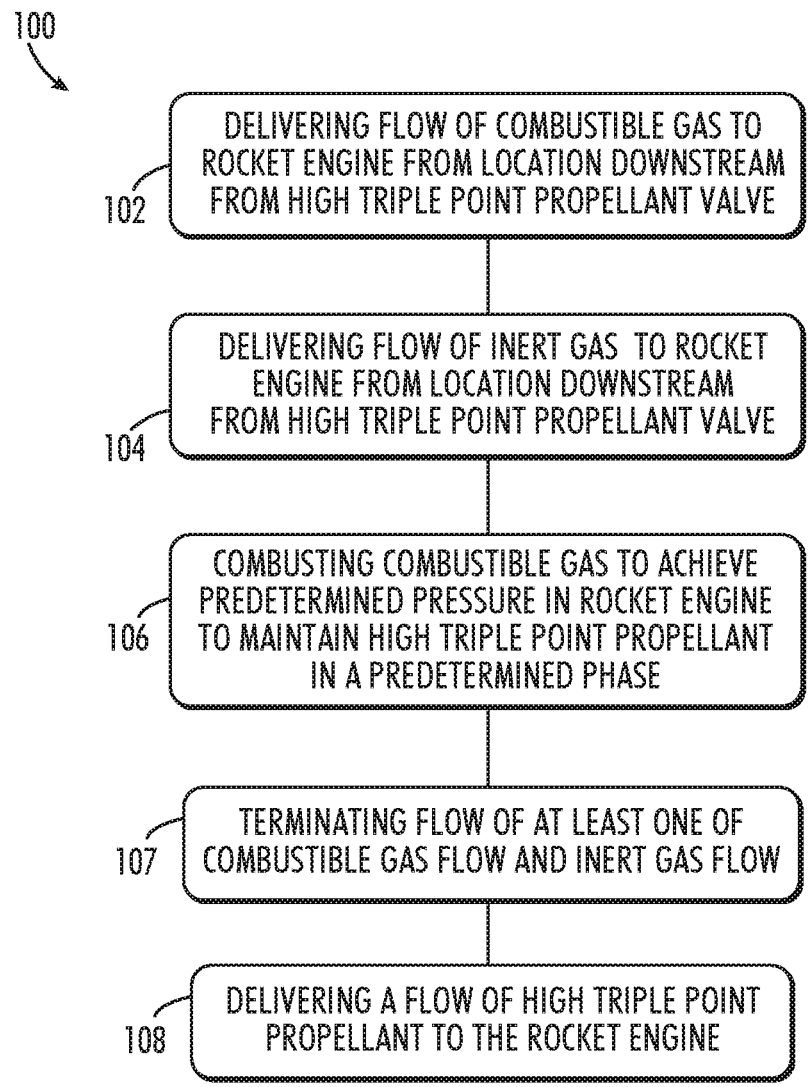

FIG. 10 outlines a further method 100 for maintaining a high triple point propellant in a predetermined phase during a rocket ignition comprising 102 delivering a flow of combustible gas to a rocket engine at a location downstream from a high triple point propellant valve, 104 delivering a flow of inert gas to the rocket engine combustion chamber from a location downstream from the high triple point propellant valve, 106 combusting combustible gas to achieve a predetermined pressure in the rocket engine combustion chamber greater than or equal to the pressure to maintain the high triple point propellant in a predetermined phase (e.g. a pressure above the high triple point propellant triple point pressure), 107 terminating the flow of at least one of the combustible gas flow and the inert gas flow, and substantially simultaneously with step 107, 108 delivering a flow of high triple point propellant to the rocket engine combustion chamber. It is understood that aspects illustrated in FIGS. 7-9 can be incorporated into the aspects of the disclosure illustrated in FIG. 10.

According to the present disclosure, the contemplated gas storage tanks for the high triple point propellants comprise features and are made from materials necessary to safely contain propellants under required pressures, and that conform to accepted safety standards in the field. The present disclosure further contemplates not only storage tanks, but also holding tanks that contain propellants manufactured during in flight missions. Further the present disclosure contemplates variations whereby storage and holding tanks for propellants may be absent if a propellant generation means can provide adequate propellant fuel on demand under the required pressure and in suitable quantities to achieve the predetermined amount of propellant for ignition, liftoff, in mission maneuvering, etc. Typical high triple point propellants are contained under a pressure ranging from about 40 psi to about 1500 psi. Therefore according to aspects of the present disclosure, the combustible gas used to pre-pressurize the engine chamber and, if desired, to pre-pressurize the propellant line would be, at least upon combustion, approximately at least as great, or greater than the pressure of the high triple point propellant. According to aspects of the present disclosure, the combustible gas used to pre-pressurize the engine chamber and, if desired, to pre-pressurize the propellant line would be upon combustion, approximately 10 psi to 50 psi greater than the triple point pressure of the high triple point propellant.

In addition, according to the present disclosure, the contemplated gas storage tanks for the combustible gas and/or the inert gas comprise features and are made from materials necessary to safely contain propellants under required pressures, and that conform to accepted safety standards in the field. The present disclosure further contemplates not only storage tanks, but also holding tanks that contain combustible gas and/or inert gas manufactured during in flight missions. Further the present disclosure contemplates variations whereby storage and holding tanks for combustible gas and/or inert gas may be absent if a combustible gas and/or inert gas generation means can provide adequate combustible gas and/or inert gas on demand at the required pressure and in suitable quantities to affect the predetermined amount of pre-pressurization of the rocket engine combustion chamber prior to delivering the flow of high triple point propellant to the rocket engine combustion chamber.

According to the present disclosure, the valves employed as propellant valves, combustible gas valves, inert gas valves may be any suitable valve that can regulate material flow, on demand, including valves associated with drive mechanisms that can be activated remotely, and that can receive signals from, and optionally send signals to a remote location for directing and monitoring valve operation. Such valves include, without limitation, selector valves, solenoid valves, check valves, etc. It is further contemplated that any useful array of valves may be used, including, without limitation, valves that can deliver one or more of: the propellant gas, the combustible gas, and the inert gas (when present). In addition, the present disclosure contemplates that one or more of the propellant gas, the combustible gas and the inert gas (when present) may have individual valves dedicated to delivering solely propellant gas, combustible gas and inert gas (when present).

According to aspects of the present disclosure, contemplated high triple point propellants comprise a monopropellant including, without limitation, nitrous oxide. Contemplated high triple point propellants further comprise a blended fuel including, without limitation, nitrous oxide/propane, nitrous oxide/acetylene, nitrous oxide/ethane, nitrous oxide/ethylene, and combinations thereof. Still further, contemplated high triple point propellants further comprise a bi-propellant including, without limitation, all of the blended propellants listed herein and, in addition, without limitation, nitrous oxide/methane, and nitrous oxide/oxygen.

According to aspects of the present disclosure, the combustible gas comprises a monopropellant, a blended fuel propellant, a bi-propellant or combinations thereof. Suitable combustible gases include, without limitation, oxygen/hydrogen, methane/oxygen, nitrogen/hydrogen/oxygen or combinations thereof, When the presence of an inert gas flow is desirable, according to aspects of the present disclosure, the inert gas comprises, without limitation, nitrogen, helium, argon, neon, krypton or combinations thereof.

The propellant lines, combustible gas lines, and inert gas lines contemplated by the present disclosure include lines made from materials able to withstand environmental demands of temperature and pressures of the liquids and gases contemplated, as well as the environmental temperatures and pressures such lines would be subjected to during a mission, such as, for example, in space.

When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific aspects, the details of these aspects are not to be construed as limitations. While variations and alternatives of the present disclosure have been illustrated and described, it will be appreciated that various changes and substitutions can be made therein without departing from the spirit and scope of the disclosure.

What is claimed is:

1. A method of maintaining a propellant in a predetermined phase during ignition of a rocket engine comprising:
   delivering a flow of combustible gas to a location downstream from a triple point propellant valve;
   releasing the flow of combustible gas into a rocket engine combustion chamber to pre-pressurize said rocket engine combustion chamber to a pressure that is greater than or equal to a triple point pressure of the propellant before the release of a propellant flow into the rocket engine combustion chamber;
   combusting the combustible gas to achieve a predetermined pressure in the rocket engine combustion chamber, wherein the predetermined pressure is greater than or equal to the triple point pressure to maintain the propellant in the predetermined phase;
   wherein the propellant flow comprises said propellant, said propellant in communication with the rocket engine combustion chamber via a propellant line;
   wherein the rocket engine comprises:
      a propellant valve, said propellant valve in communication with the propellant line, with said propellant valve operable to selectively regulate flow of the propellant;
      a combustible gas valve in communication with a combustible gas line, said combustible gas valve operable to selectively regulate flow of combustible gas to the rocket engine combustion chamber;
      a sensor located proximate to the propellant valve, said sensor configured to sense said predetermined pressure in the propellant line downstream of the propellant valve;
   wherein the combustible gas is in communication with the rocket engine combustion chamber via the combustible gas line, said combustible gas line oriented at a predetermined location downstream of the propellant valve, said combustible gas line separate from the propellant line.

2. The method of claim 1, further comprising:
   terminating the flow of combustible gas; and
   substantially simultaneously with the step of terminating the flow of combustible gas, delivering a flow of propellant to the rocket engine combustion chamber at a predetermined phase.

3. The method of claim 2, wherein, in the step of delivering a flow of propellant to a rocket engine combustion chamber, the propellant comprising at least one of: a monopropellant, a blended fuel propellant, a bi-propellant and combinations thereof.

4. The method of claim 2, wherein, in the step of delivering a flow of propellant to the rocket engine combustion chamber, the propellant comprising at least one of: nitrous oxide; nitrous oxide/propane; nitrous oxide/acetylene; nitrous oxide/ethane; nitrous oxide/ethylene, nitrous oxide/methane, nitrous oxide/oxygen and combinations thereof.

5. The method of claim 1, further comprising: delivering a flow of combustible gas to the rocket engine combustion chamber at a location downstream from the propellant.

6. The method of claim 1, wherein, in the step of delivering a flow of combustible gas to the rocket engine combustion chamber at a location downstream from the propellant, the combustible gas comprises: oxygen/hydrogen; methane/oxygen; nitrogen/hydrogen/oxygen and combinations thereof.

7. The method of claim 2, wherein substantially coincident with the step of delivering a flow of combustible gas to a rocket engine combustion chamber from a location located downstream from a triple point propellant valve, further comprising the step of:

delivering a flow of inert gas to the rocket engine combustion chamber at a location downstream from the triple point propellant valve.

8. The method of claim 7, wherein substantially coincident with the step of delivering a flow of propellant to the rocket engine combustion chamber:

terminating at least one of the flow of combustible gas and the flow of inert gas.

9. The method of claim 7, wherein in the step of delivering a flow of inert gas to the rocket engine combustion chamber at a location downstream from the propellant, the inert gas comprises at least one of: nitrogen, helium, argon, neon, krypton, and combinations thereof.

10. A rocket engine comprising:

a propellant in communication with a rocket engine combustion chamber via a propellant line, said propellant having a triple point pressure;

a propellant valve, said propellant valve in communication with the propellant line, with said propellant valve operable to selectively regulate flow of the propellant;

a combustible gas in communication with the rocket engine combustion chamber via a combustible gas line, said combustible gas line oriented at a predetermined location downstream of the propellant valve, said combustible gas line separate from the propellant line;

a combustible gas valve in communication with the combustible gas line, said combustible gas valve operable to selectively regulate flow of combustible gas to the rocket engine combustion chamber;

a sensor located proximate to the propellant valve, said sensor configured to sense a predetermined pressure in the propellant line downstream of the propellant valve;

wherein said rocket engine combustion chamber is in communication with the propellant line, and said combustion chamber further in communication with the combustible gas line, and wherein said combustible gas valve selectively regulates flow of said combustible gas into the rocket engine combustion chamber; and wherein said flow of said combustible gas is configured to be released into the rocket engine combustion chamber to pre-pressurize said rocket engine combustion chamber to a pressure that is greater than or equal to the triple point pressure of the propellant before the release of a propellant flow into the rocket engine combustion chamber.

11. The rocket engine of claim 10, wherein the propellant comprises at least one of: a monopropellant, a blended fuel propellant, a bi-propellant, and combinations thereof.

12. The rocket engine of claim 10, wherein the propellant comprises at least one of: nitrous oxide; nitrous oxide/propane; nitrous oxide/acetylene; nitrous oxide/ethane; nitrous oxide/ethylene; nitrous oxide/methane; nitrous oxide/oxygen, and combinations thereof.

13. The rocket engine of claim 10, wherein the combustible gas comprises at least one of: hydrogen/oxygen; methane/oxygen; nitrogen/hydrogen/oxygen and combinations thereof.

14. The rocket engine of claim 10, further comprising:

an inert gas in communication with the combustion chamber via an inert gas line; and an inert gas valve in communication with the inert gas line, said inert gas valve operable to regulate flow of the inert gas into the combustion chamber.

15. The rocket engine of claim 14, wherein the inert gas comprises at least one of: nitrogen, helium, argon, neon, krypton, and combinations thereof.

16. The rocket engine of claim 14, wherein at least one of the propellant valve and the combustible gas valve is operable to regulate the flow of at least two of: the propellant gas, the combustible gas and the inert gas.

17. The rocket engine of claim 10, wherein the rocket engine is operable to achieve engine restart.

18. A rocket comprising the rocket engine of claim 10.

19. A vehicle comprising the rocket engine of claim 10, wherein the vehicle comprises at least one of:

a manned aircraft, an unmanned aircraft, a manned spacecraft, an unmanned spacecraft, a manned rotorcraft, an unmanned rotorcraft, a manned satellite, an unmanned satellite, a manned terrestrial vehicle, an unmanned terrestrial vehicle, a manned surface marine vehicle, an unmanned surface marine vehicle, a manned sub-surface marine vehicle, an unmanned sub-surface marine vehicle, and combinations thereof.

* * * * *